Dec. 16, 1958 P. R. R. AIGRAIN ET AL 2,864,901

HYBRID CIRCUITS FOR CONNECTING A FOUR WIRE TRANSMISSION LINE TO A TWO WIRE TRANSMISSION LINE

Filed June 24, 1953

Inventor
P.R.R. AIGRAIN
M.C.E. BATAILLE
By Robert Harding Jr.
Attorney

United States Patent Office 2,864,901

Patented Dec. 16, 1958

2,864,901

HYBRID CIRCUITS FOR CONNECTING A FOUR WIRE TRANSMISSION LINE TO A TWO WIRE TRANSMISSION LINE

Pierre Roger Raoul Aigrain and Maurice Camille Eugene Bataille, Paris, France, assignors to International Standard Electric Corporation, New York, N. Y., a corporation of Delaware Application June 24, 1953, Serial No. 363,852

3 Claims. (Cl. 179—170)

The present invention relates to improvements in hybrid circuits such as those used in transmitting systems for connecting a four wire transmitting line to a two wire transmission line.

There are a great number of hybrid circuits known which provide a connection in both directions between the four wire circuit and the two wire circuit, and capable of avoiding oscillations or which is known as the Larsen effect. This invention has particular utility in the telephone transmission system in which it is necessary to provide a connection between a two wire subscriber's station circuit and the four wire transmission circuit which is provided in a central exchange.

One of the objects of the present invention is to provide a simple hybrid circuit comprising a transformer and an amplifying element giving better results than those obtained with hybrid circuits ordinarily used.

According to one of the features of the invention, a hybrid circuit comprises in combination: a transformer comprising a primary winding and at least first and second secondary windings; means for connecting the two wire circuit to the primary winding; means for connecting the input or transmitting pair of wires of the four wire circuit to the first secondary winding; an amplifier comprising an input and two outputs; means for applying the output or received signals of the four wire circuit to the input of the amplifying circuit; means for applying the output signals obtained at one of the outputs of the amplifier to the second winding of the said transformer in order to obtain signals by induction at the terminals of the primary winding, and, however, signals are also produced at the terminals of the first secondary winding; and means adapted for applying to the first secondary winding, signals from the second output of the amplifying circuit, which are adapted to have the same amplitude as the induced signals in the said first secondary winding but having an opposite phase.

Other objects, features and advantages of the present invention will appear from a reading of the following description of an embodiment of the present invention, the said description being given in connection with the accompanying drawings in which.

The invention will be described by referring more particularly to a line circuit adapted to be used for connecting a subscriber's two wire line to a four wire transmitting circuit, for example in an automatic telephone central exchange.

Figure 1:
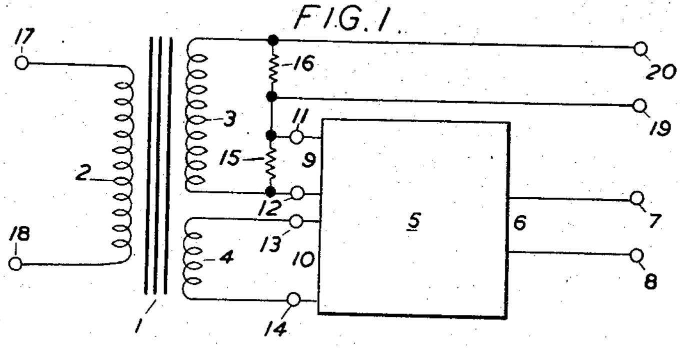
Fig. 1 is an embodiment of the invention.

Referring to Fig. 1 a transformer 1 is provided comprising a primary winding 2 and two secondary windings 3 and 4. An amplifier 5 comprising an input 6 and two outputs 9, 10 (terminals 11, 12 and terminals 13, 14 respectively), is coupled between the two secondary windings. The impedance of the output 10 comprises the secondary winding 4, and the load impedance of the output 9 comprises impedance 15. The impedance constituted by the secondary winding 3 and the impedance 16 is high with respect to the impedance 15. The two wire transmitting circuit is connected to the terminals 17 and 18 of the primary winding 2.

The output or receiving circuit of the four wire transmission line is connected to the input terminals 7 and 8 of the amplifying circuit 5, whereas the input or transmitting circuit of the four wire transmission line is connected to the terminals 19 and 20. When the signals are applied to the input terminals 7 and 8 of the amplifier 5, they appear amplified at the two outputs of the amplifier. The output current which traverses the secondary winding 4 of the transformer 1 induces currents in the primary winding 2 and in the secondary winding 3. The potentials which appear at the terminals 17 and 18 of the primary winding 2 are applied to the two wire transmitting system which is connected to these terminals. The output current obtained at the output 9 of the amplifier 5 traverses mainly the impedance 15, the shunted currents in the circuit consisting of the secondary winding 3 and the impedance 16 being negligible with respect to the current passing through the impedance 15. The potentials which appear at the terminals of the secondary winding 3 are therefore added to the potentials which appear at the terminals of the impedance 15. If the ratio between the windings and the direction of the winding 3 are chosen properly, potentials may be obtained at the terminals of the secondary winding 3 having equal amplitudes and in phase opposition to the potentials which appear at the terminals of the impedance 15, so that no potential variations appear between the transmitting terminals 19 and 20. If potential variations are applied at the terminals 17 and 18 of the primary winding 2 of the transformer, these potential variations appear at the terminals of the secondary windings 3 and 4 of the transformer 1. The potential variations at the terminals of the winding 3 appear nearly completely at the terminals of the impedance 16 and they are consequently applied to the input or transmitting circuit of the four wire transmission line. The potential variations which appear at the terminals of the winding 4 and are applied at the output 10 of the amplifier 5, are absorbed in the amplifier because the amplifier is unidirectional and they do not appear at the terminals 7 and 8.

Figure 2:
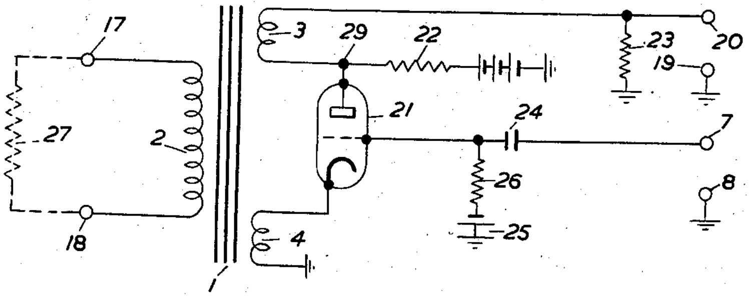
Fig. 2 is a hybrid circuit embodying features of the invention.

Referring now to Fig. 2, the amplifier 5 is shown schematically and the elements fulfilling the same function in Figs. 1 and 2 are designated by the same references. The amplifier comprises a triode 21 and the cathode load is constituted by the secondary winding 4 of the transformer 1; the anode of the triode is connected to the positive terminal of the high voltage battery through the load resistance 22 and is connected to ground through the secondary winding 3 of the transformer 1 and the output impedance 23. The impedance constituted by the secondary winding 3 and the impedance 23 is high with respect to the impedance 22, so that the current traversing the secondary winding 3 of the transformer is negligible with respect to the current traversing the resistance 22. The grid of triode 21 is connected over a condenser 24, to the output terminal of the four wire circuit and to a biasing source 25 through the resistance 26. The terminals 17 and 18 of the primary winding 2 of the transformer 1 are connected to the two wire transmission system which, in a particular embodiment, comprises a resistance of the order of 600 ohms which has been represented in dotted line 27. If a signal is applied to the output or receiving terminals 7 and 8 of the four wire transmission system, the potential variations applied to the grid of the triode cause, by means of the winding 4, potential variations at the terminals of the primary winding 2 and at the terminals of the secondary winding 3. If the direction of the winding 4 with respect to the winding 3 is suitably chosen, and if the ratio of the numbers of turns of these two windings is suitably chosen, the potential variations which appear at the terminals of the winding 3 have the same amplitude and are in phase opposition with respect to the potential variations of point 29 so that the potential of point 20 remains the same. If potential variations are now applied to the terminals 17 and 18, they appear at the terminals of the secondary winding 3 to which is connected the input of the four wire transmission line. A bi-directional transmission has been provided between the two wire transmission line and the four wire transmission line, respectively.

Figure 3:
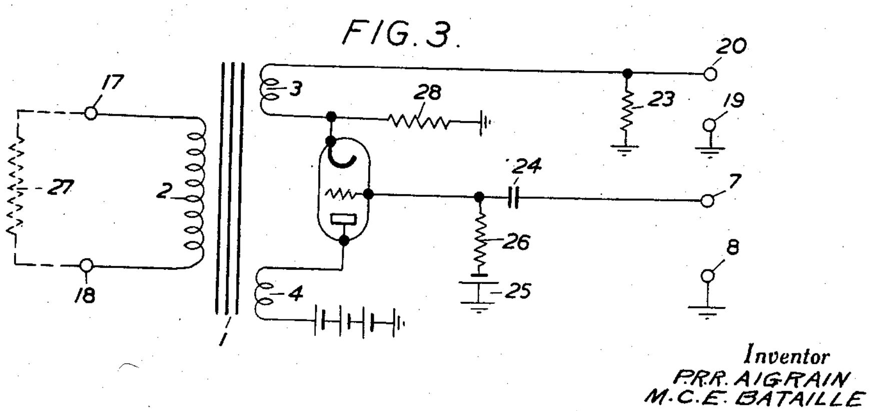
Fig. 3 is an alternative arrangement of the circuit illustrated in Fig. 2.

Fig. 3 represents an alternative embodiment of the circuit shown in Fig. 2. In this circuit, the elements fulfilling the same function as in the circuit of Fig. 2 have been designated by the same references. The circuit of Fig. 3 employs as the circuit of Fig. 2, a three winding transformer and an amplifying triode. The anode circuit of the triode is loaded by the secondary winding 4 of the transformer 1, whereas the cathode circuit is loaded by the impedance 28. The secondary winding 3 and the resistance 23 are connected in parallel with the impedance 28 but, as this has been explained in Fig. 2 in conjunction with the impedance 22 and the secondary winding 3 of the transformer, the total impedance of the secondary winding 3 and of the resistance 23 is high with respect to the impedance 28. The operation of the circuit shown in Fig. 3 is quite analogous to that of Fig. 2 and gives substantially identical results.

While the principles of the invention have been described above in connection with specific embodiments and particular modifications thereof, it is to be clearly understood that this description is made only by way of example and not as a limitation on the scope of the invention.

What is claimed is:

1. A hybrid circuit comprising a two wire circuit and a four wire circuit, a transformer having a primary winding and at least first and second secondary windings, means for connecting the two wire circuit across said primary winding, means for connecting the transmitting pair of wires of said four wire circuit across said first secondary winding of said transformer, an amplifier having an input and first and second outputs, means for connecting the receiving pair of wires of said four wire circuit to the input of said amplifier, means for connecting said first amplifier output directly to said second secondary winding of said transformer, whereby signals from said amplifier are induced across said primary winding and across said first secondary winding, and means connecting said second amplifier output directly to said first secondary winding for applying signals thereto which have the same amplitude as the induced signals but which are opposite in phase.

2. A hybrid circuit, as defined in claim 1, in which the amplifier is an electron discharge device having an anode, a cathode, and a control electrode, the amplifier input being connected between said cathode and said control electrode, the first amplifier output being connected to said cathode, and the second amplifier output being connected to said anode.

3. A hybrid circuit, as defined in claim 1, in which the amplifier is an electron discharge device having an anode, a cathode, and a control electrode, the amplifier input being connected between said control electrode and said cathode, the first amplifier output being connected to said anode, and the second amplifier output being connected to said cathode.

References Cited in the file of this patent

UNITED STATES PATENTS

| | | |
|---|---|---|
| 2,284,064 | Morgan | May 26, 1942 |
| 2,511,948 | Wang | June 20, 1950 |
| 2,615,997 | Brodie | Oct. 28, 1952 |

FOREIGN PATENTS

| | | |
|---|---|---|
| 321,673 | Great Britain | Nov. 15, 1929 |